US007231377B2

(12) United States Patent
Soluk et al.

(10) Patent No.: US 7,231,377 B2
(45) Date of Patent: Jun. 12, 2007

(54) METHOD AND APPARATUS FOR CONFIGURING A SERVER USING A KNOWLEDGE BASE THAT DEFINES MULTIPLE SERVER ROLES

(75) Inventors: Kirk Soluk, Bellevue, WA (US); Vishnu A. Patankar, Kirkland, WA (US); Hitesh Raigandhi, Redmond, WA (US); Nick Finco, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 805 days.

(21) Appl. No.: 10/438,180

(22) Filed: May 14, 2003

(65) Prior Publication Data

US 2004/0220894 A1 Nov. 4, 2004

(51) Int. Cl.
*G06F 17/00* (2006.01)
*G06N 5/02* (2006.01)

(52) U.S. Cl. ............................ 706/46; 706/12; 706/14

(58) Field of Classification Search ................. 706/46, 706/12, 14; 709/223
See application file for complete search history.

(56) References Cited

U.S. PATENT DOCUMENTS 5,819,030 A 10/1998 Chen et al.
6,308,188 B1 10/2001 Bernardo et al.
6,434,607 B1 8/2002 Haverstock et al.
6,466,972 B1 10/2002 Paul et al.
6,567,849 B2 5/2003 Ludovici et al.
2002/0002611 A1* 1/2002 Vange ........................ 709/223
2002/0161674 A1* 10/2002 Scheer ........................ 705/28
2003/0050998 A1* 3/2003 Garnett et al. .............. 709/217
2003/0108018 A1* 6/2003 Dujardin et al. ............ 370/338
2004/0010575 A1* 1/2004 Wookey et al. ............. 709/223
2004/0031058 A1* 2/2004 Reisman ..................... 725/112

OTHER PUBLICATIONS

Kyung Hyu Lee, An Agent-Manager Scheme for the Integrate Transport Network Management, 1999, IEEE, 1017-1021.*
Gurgens, et al.; "Role based specification and security analysis of cryptographic protocols using asynchronous product automata"; Proceedings of the 13th International Workshop on Database and Expert Systems Applications (DEXA'02); 1529-4188/02 IEEE; Computer Science Society, 2002.
Noel; "New Roles Taking Shape in Enterprise IT Infrastructure"; A sponsored Supplement to Software Magazine; Summer Edition, vol. 22, No. 2, pp. 25-32, 2002.
Raynal, F.; "Bastille Linux"; Multi-System & Internet Security Cookbook (Misc); 2000.

* cited by examiner

*Primary Examiner*—Joseph P Hirl
(74) *Attorney, Agent, or Firm*—Lee & Hayes, PLLC

(57) ABSTRACT

A process identifies multiple server roles and stores the server roles in a knowledge base. For each of the multiple server roles, the process identifies at least one service used by the server role, at least one communication port used by the server role, and any web-related requirements of the server role. This identified information regarding each of the server roles is stored in the knowledge base.

32 Claims, 12 Drawing Sheets

300

```
- <SCWKnowledgeBase schemaLocation="W2k3.xsd">
  - <Roles>
      ...
    - <Role Type="Server">
        <Name>WEB</Name>
      - <Selected>
          <Maximum Value="FALSE" />
          <Typical Value="CUSTOM" FunctionName=
            "SvcapisServingWebPages" DLLName="scwhlp.dll" />
        </Selected>
    - <Services>
      - <Service>
          <Name>IISAdmin</Name>
        </Service>
    - <Service>
        <Name>HTTPFilter</Name>
      </Service>
    - <Service>
        <Name>W3SVC</Name>
      </Service>
    </Services>
  - <Ports>
    - <Port>
        <Name>HTTP</Name>
        <Type>Inbound</Type>
      </Port>
  - <Port>
        <Name>HTTPS</Name>
        <Type>Inbound</Type>
      </Port>
    </Ports>
  </Role>
</Roles>
```

```
- <Ports>
   ...
  - <Port>
      <Name>HTTP</Name>
      <Number>80</Number>
  - <Protocols>
    - <Protocol>
        <Name>TCP</Name>
      </Protocol>
    </Protocols>
  </Port>
- <Port>
      <Name>HTTPS</Name>
      <Number>443</Number>
  - <Protocols>
    - <Protocol>
        <Name>TCP</Name>
      </Protocol>
    </Protocols>
  </Port>
 </Ports>
</SCWKnowledgeBase>
```

```
- <Role Type="Server" SourceKB="W2k3.xml">
      <Name>WEB</Name>
      <Satisfiable>FALSE</Satisfiable>
      <Selected>FALSE</Selected>
  - <Services>
    - <Service>
        <Name>IISAdmin</Name>
      </Service>
    - <Service>
        <Name>HTTPFilter</Name>
      </Service>
    - <Service>
        <Name>W3SVC</Name>
      </Service>
    </Services>
  - <Ports>
    - <Port>
        <Name>HTTP</Name>
        <Type>Inbound</Type>
      </Port>
    - <Port>
        <Name>HTTPS</Name>
        <Type>Inbound</Type>
      </Port>
    </Ports>
  </Role>
```

```
- <SecurityPolicy>
  - <Extension ID="{A1D76559-8DB5-3F05-9821-
    B495A565076C}" Name="SCE">
      <Service Name="Alerter" StartupMode="Disabled" />
      <Service Name="browser" StartupMode="Disabled" />
      <Service Name="ComSysApp" StartupMode="Manual" />
      <Service Name="CryptSvc" StartupMode="Automatic" />
      <Service Name="EventLog" StartupMode="Automatic" />
      <Service Name="ProtectedStorage" StartupMode=
         "Automatic" />
      <Service Name="uploadmgr" StartupMode="Disabled" />
      ...
    </Extension>
- <Extension ID="{78A2BE03-EFE1-4695-96B8-33C477241BC9}"
  Name="IPSec">
  - <Filters Type="Destination">
    - <Interface>
        <IPAddress>157.59.132.0</IPAddress>
        <SubnetMask>255.255.252.0</SubnetMask>
    - <PortExemptions>
      - <Port>
          <Number>80</Number>
          <Type>Inbound</Type>
      - <Protocols>
          <Protocol>TCP</Protocol>
        </Protocols>
      </Port>
    - <Port>
        <Number>443</Number>
        <Type>Inbound</Type>
    - <Protocols>
        <Protocol>TCP</Protocol>
      </Protocols>
     </Port>
    </PortExemptions>
   </Interface>
 </Filters>
 <Permitted />
 <Trusted />
- <DynamicExemptions>
   <Type>SUS</Type>
 </DynamicExemptions>
```

```
    - <ProtocolExemptions>
        <Type>ICMP</Type>
      </ProtocolExemptions>
    - <Security>
      - <Authentication>
          <Kerberos>Yes</Kerberos>
        </Authentication>
      </Security>
    </Extension>
- <PolicyAuthoringData>
  - <Extension ID="{43F65325-1C59-4748-A455-
    81F4146B209F}" Name="SCW">
      <PrototypeMachine Name="TEST" />
    - <Selection>
      - <Roles>
        - <Role>
            <Name>File</Name>
          </Role>
        - <Role>
            <Name>WEB</Name>
          </Role>
        - <Role>
            <Name>WindowsUpdate</Name>
          </Role>
        </Roles>
      - <Tasks>
        - <Task>
            <Name>Backup</Name>
          </Task>
        - <Task>
            <Name>ErrorReporting</Name>
          </Task>
        - <Task>
            <Name>RemotePrinting</Name>
          </Task>
        </Tasks>
      </Selection>
    </Extension>
  </PolicyAuthoringData>
</SecurityPolicy>
```

Fig. 9B

METHOD AND APPARATUS FOR CONFIGURING A SERVER USING A KNOWLEDGE BASE THAT DEFINES MULTIPLE SERVER ROLES

TECHNICAL FIELD

The systems and methods described herein relate to configuring one or more servers using information contained in a knowledge base.

BACKGROUND

Different types of servers are used to perform a variety of tasks in, for example, a network environment. Example servers include file servers, print servers and web servers. A file server is a computing device and a storage device that stores files. Users on a network can store files to the file server and retrieve files from the file server. A print server is a computing device that manages one or more printers coupled to the print server or coupled to a common network. A web server is a computing device coupled to a network (such as the Internet) that delivers (i.e., serves up) web pages. A web server has an IP address and, in some cases, a domain name.

Servers are often dedicated such that they do not perform other tasks outside their server tasks. Certain servers may be capable of performing multiple tasks or functioning as multiple servers simultaneously (such as a file server and a print server).

Initially, a server needs to be configured to perform the various functions desired by a network administrator or other operator. Configuration of the server may also define certain operating characteristics, such as what types of users can access the server, how the server handles various types of requests, and what types of data should be encrypted by the server.

In existing systems, network administrators or other operators are responsible for configuring servers. Often, this configuration requires a significant amount of understanding and low-level control of the various operating characteristics. These manual tasks are time-consuming and may be redundant if the network administrator is configuring multiple servers that perform similar functions. In these situations, the "quality" of the server configuration is dependent on the knowledge and skill of the network administrator. If the network administrator is inexperienced at configuring servers, the server may not be configured in the best possible manner. Improper or inefficient server configuration may cause problems, such as poor server performance or inadequate server security.

Accordingly, there is a need for improved techniques for configuring one or more servers.

SUMMARY

The systems and methods described herein generate and utilize one or more knowledge bases to configure a server. In one embodiment, multiple server roles are identified and stored in a knowledge base. For each of the multiple server roles, the process identifies at least one service used by the server role, at least one communication port used by the server role and any web-related requirements of the server role. The identified information regarding each of the multiple server roles is stored in the knowledge base.

BRIEF DESCRIPTION OF THE DRAWINGS

Similar reference numbers are used throughout the figures to reference like components and/or features.

FIGS. 3A and 3B illustrate data contained in a portion of an example knowledge base.

FIG. 8 illustrates an example of a Runtime XML file associated with one or more servers.

FIGS. 9A and 9B illustrate an example of an Output XML file associated with one or more servers.

DETAILED DESCRIPTION

The systems and methods described herein allow an administrator to automatically configure one or more servers based on a role (or roles) that the server will be performing. When configuring a target server, the systems and methods described herein access data contained in one or more knowledge bases along with user-supplied input regarding how the target server will be used. The knowledge bases contain information regarding operating system and application parameters that need to be configured or analyzed from a security perspective. A configuration engine receives high-level configuration information and transforms that information into a native configuration language associated with the target server. The configuration engine also resolves various environment-specific variables, such as determining what domain controllers are associated with a particular server.

Various examples discussed herein refer to one or more servers. As used herein, a "server" is any computing device capable of performing functions defined by a particular server type. As discussed herein, a computing device may need to be configured to operate as a particular type of server. For example, a "file server" is any computing device capable of performing the functions and tasks defined by a file server role, such as receiving files, storing files and providing files to requesting devices. In particular embodiments, a "server" is a general purpose computer. A particular server may function as two or more servers simultaneously, such as a file server and a print server.

Particular examples discussed herein refer to configuration of a single server. However, the systems and methods discussed herein can be applied to the configuration of any number of servers. For example, if two servers are to be configured in similar ways, the two servers can be configured simultaneously by creating a transform that can be deployed simultaneously to configure two or more different servers.

As discussed herein, a particular server may be configured to perform one or more roles. A role defines, for example, a set of functions or tasks that the server performs. Example roles include a file server, a print server, a web server, a domain controller, a DNS server, an SMTP server and a terminal server. A file server role, for example, receives files, stores files and responds to file access requests. Various security parameters are associated with the different roles. For example, roles may have associated security parameters relating to account login policies, event log settings, port filtering policies, Internet Protocol Security (IPSec) policies and security-related registry values. Additional details regarding roles are provided below.

Figure 1:
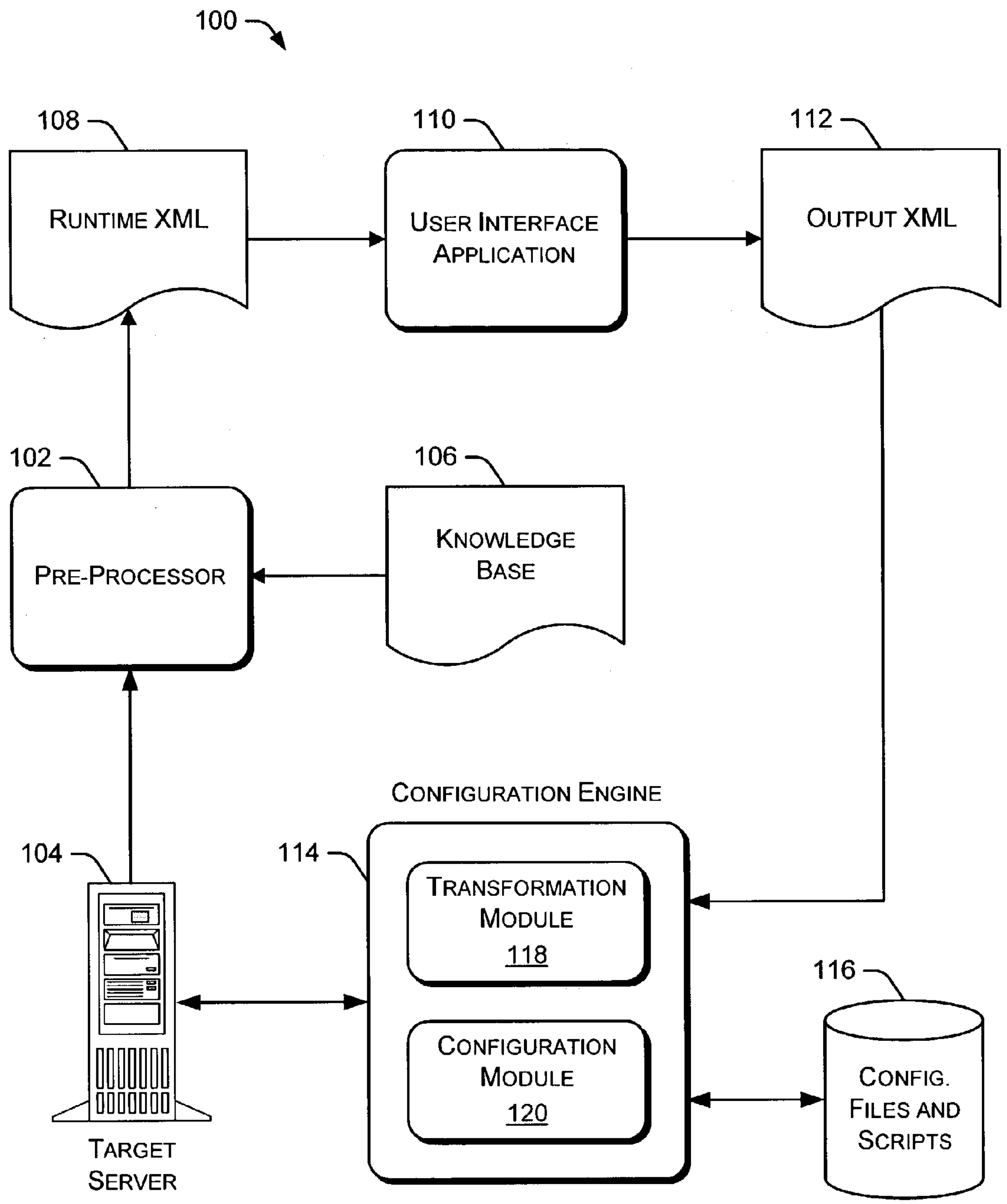
FIG. 1 is a block diagram illustrating an example architecture capable of configuring one or more servers.

FIG. 1 is a block diagram illustrating an example architecture 100 capable of configuring one or more servers. A pre-processor 102 is coupled to a target server 104. Target server 104 is a server being configured or re-configured. Pre-processor 102 obtains information from target server 104, such as how the target server is currently configured, the types of roles that the target server is able to perform, etc. Pre-processor 102 also retrieves information from a knowledge base 106. Knowledge base 106 is an Extensible Markup Language (XML) file that identifies operating system and application parameters that need to be configured or analyzed from a security perspective. The information in knowledge base 106 is abstracted into functional terms that are more easily understood by network administrators who are not necessarily server or security experts. Knowledge base 106 also contains user interface directives that help determine the default values rendered by the user interface under various circumstances such as the current configuration of the target server 104 and previous choices made by the user. Additionally, knowledge base 106 defines mappings between abstractions (e.g., roles) defined in the user interface and the underlying settings (e.g., services).

In a particular implementation, target server 104 is not actually configured. Instead, target server 104 is merely used to assist a user in creating a policy for a system similar to the target server. The target server assists the user by causing the filtering out of information in the knowledge base that doesn't apply to the environment for which the user is creating a policy. In an alternative embodiment, a target server is not used to generate a policy. In this embodiment, the user has access to all data in the knowledge base.

Pre-processor 102 creates a run-time specific knowledge base, which is referred to in FIG. 1 as a Runtime XML 108. Runtime XML 108 is created by comparing the raw knowledge base data 106 to the current state of target system 104. By pre-processing the knowledge base data 106, a user interface application 110 (which receives Runtime XML 108) is able to render more appropriate information and start with more accurate details. For example, if particular roles cannot be supported by target server 104, Runtime XML 108 can indicate those unavailable roles such that user interface application 110 does not offer those unavailable roles to the network administrator for selection by default. Additionally, pre-processor 102 identifies other information that is not contained in knowledge base 106, such as network configuration information (e.g., network interface controllers and IP addresses on the target server). This information is provided to user interface application 110.

In a particular embodiment, Runtime XML 108 contains all of the data from knowledge base 106, but the data elements are "tagged" to indicate whether the particular elements (e.g., particular roles) are supported by target server 104. An example tag is: <Satisfiable>TRUE</Satisfiable> In another embodiment, the data elements that are not supported by target server 104 are filtered out by pre-processor 102 such that they are not included in Runtime XML 108. Runtime XML 108 can be stored on a storage device, such as a hard disk drive, for later retrieval by user interface application 110 or other applications. This architecture decouples the user interface application 110 from the configuration engine 114, discussed below. This architecture allows for free-form XML based data structures as a way of interacting between the configuration engine and the user interface application.

Runtime XML 108 is provided to user interface application 110, which obtains additional input about the desired configuration of target server 104 from a network administrator or other individual. Using the data in Runtime XML 108, user interface application 110 is able to restrict the options and configuration information requested from the network administrator to those options and configuration information that are relevant to target server 104. For example, if target server 104 is not capable of functioning as a DNS server, then user interface application 110 does not present that option to the network administrator. Additionally, if user interface application 110 identifies the operating system (OS) level of target server 104 (e.g., by querying the target server), the knowledge base data can be consulted to determine the set of security levels supported by the target server's OS. Thus, user interface application 110 utilizes information from knowledge base 106 and knowledge of the current state of target server 104 to solicit functional server requirements from the network administrator and generate a resulting security policy (shown in FIG. 1 as an Output XML 112). In one embodiment, the user interface application 110 queries the OS version to determine which knowledge base should be used. In this embodiment, there is a primary knowledge base associated with each OS version.

Output XML 112 is provided to a configuration engine 114 that is coupled to target server 104. Configuration engine 114 (also referred to as a "back-end engine") provides a framework and a set of components, a transformation module 118 and a configuration module 120, that can transform Output XML 112 generated by user interface application 110 into native scripts and configuration files. These native scripts and configuration files are stored temporarily or permanently on a data storage device 116 coupled to configuration engine 114. The native scripts and configuration files are subsequently applied to target server 104 during a configuration phase. Configuration engine 114 also enables or disables various services, as needed, to implement the roles selected by the user through user interface application 110. Configuration engine 114 also supports rollback and analysis operations in addition to configuration operations. Rollback is a flag that can be passed to a "back-end" transformation or application engine. A rollback transformation compares the configuration policy to the current state of the system and stores the current values for the changes that would be made if the policy were applied.

Analysis operations determine whether a system is in compliance with a particular policy. For example, if an output policy indicates "disable service x", the analysis operations will generate a warning if service x is enabled. The primary difference between the analysis operations and rollback is their outputs. The rollback output needs to be resubmitted to the configuration engine and the analysis operation output needs to be viewable in a user interface.

Transformation module 118 (in configuration engine 114) transforms the data in Output XML 112 into native scripts and configuration files. Output XML 112 is typically a high-level policy written in XML. Transformation module 118 transforms the high-level policy to native scripts and configuration files that can be understood by target server 104. Configuration module 120 applies one or more policies (defined by native scripts and configuration files) to target server 104, thereby configuring the target server. The transformation performed by transformation module 118 is similar to the compilation function performed by a compiler to convert source code into object code for a particular processor architecture. Output XML 112 is similar to the source code and the resulting native scripts and configuration files are created for a particular architecture (the, target server).

In one embodiment, Output XML 112 represents a high-level policy that will be applied to the target server 104. The high-level policy is transformed into a more specific file customized for target server 104. This high-level policy can be applied to multiple different target servers, in which case a separate customized file is created for each target server. Although the high-level policy is the same, the separate customized files may differ due to differences in the target servers.

Although FIG. 1 illustrates a single knowledge base 106, a particular embodiment may include multiple knowledge bases coupled to pre-processor 102. In this embodiment, one knowledge base is the standard knowledge base containing information regarding standard server roles. Another knowledge base may define roles developed and supported by a third party. For example, a third party may define one or more roles associated with a database server. This use of multiple knowledge bases allows one knowledge base to be updated without affecting the other knowledge bases. Additionally, a user (such as a network administrator) may create their own knowledge base containing one or more role definitions. In one embodiment, these user-created role definitions replace any definitions of roles of the same name in knowledge base 106. Additional information regarding knowledge bases is provided below.

Although particular examples discussed herein refer to a target server, alternate embodiments can configure a server without having any previous knowledge of the server's current configuration or capabilities. In these alternate embodiments, the systems and methods may presume that the server is capable of performing any role.

Figure 2:
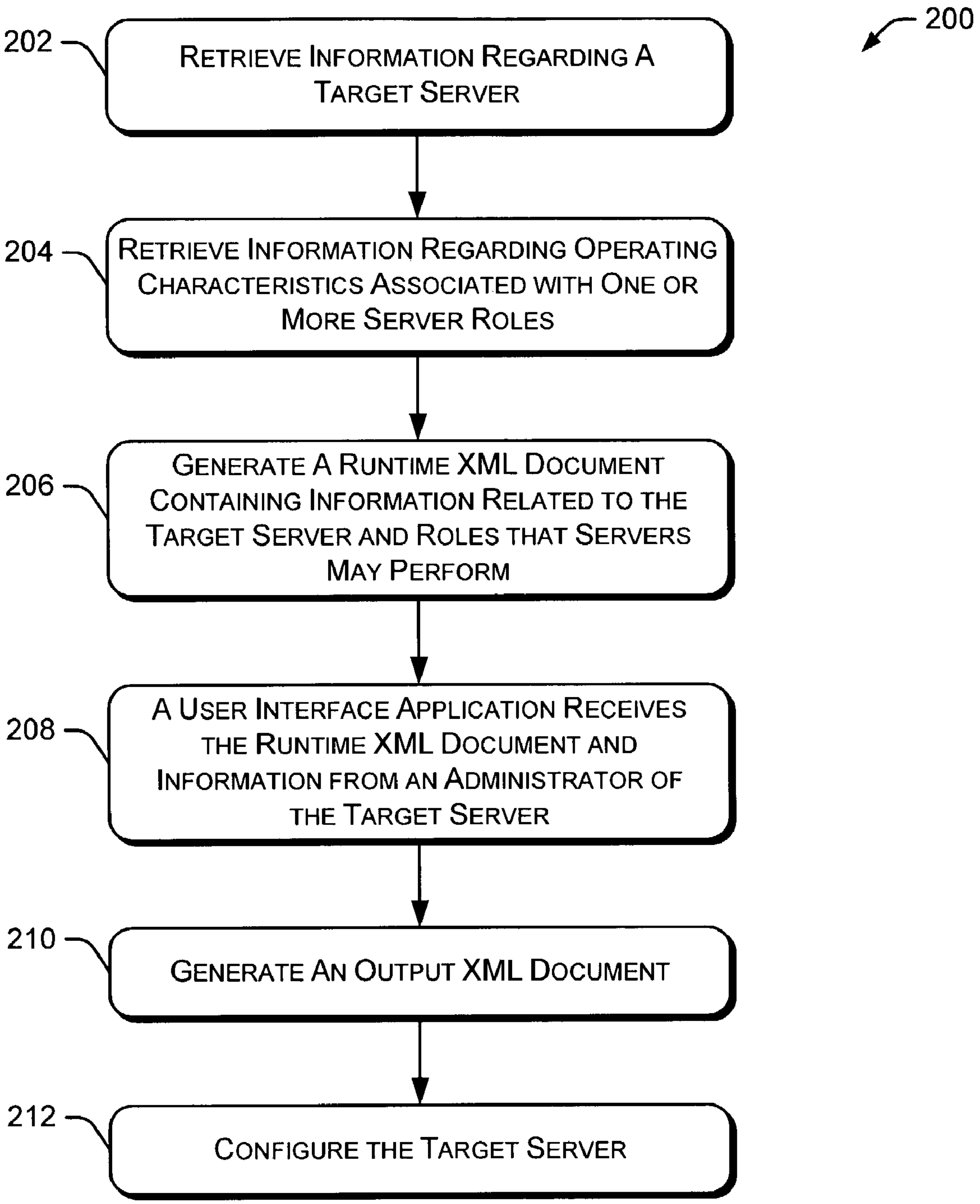
FIG. 2 is a flow diagram illustrating an embodiment of a procedure for configuring a server using the architecture of FIG. 1.

FIG. 2 is a flow diagram illustrating an embodiment of a procedure 200 for configuring a server using the architecture of FIG. 1. Initially, procedure 200 retrieves information regarding a target server (block 202). This information includes, for example, the target server's features, capabilities, and current configuration. The procedure then retrieves information regarding operating characteristics associated with one or more server roles (block 204). These operating characteristics include, for example, services used by various roles, communication ports used by various roles and Internet Information Server (IIS) requirements. The operating characteristics may also include rules for determining whether or not the role is likely being performed by the target server.

Procedure 200 continues by generating a Runtime XML document that contains information related to the target server and various roles that servers may perform (block 206). A user interface application then receives the Runtime XML document and obtains additional information from an administrator of the target server or another person (block 208). The procedure then generates an Output XML document (block 210) that contains the high level security policy for the target server or other similarly configured servers.

FIGS. 3A and 3B illustrate data 300 contained in a portion of an example knowledge base. As shown, various roles, services, ports and protocols are identified and defined. For example, a role named "WEB" has an associated type of "Server". Three different services are identified: "IISAdmin", "HTTPFilter" and "W3SVC". Additionally, two ports are identified: "HTTP" and "HTTPS". The data 300 also identifies a protocol (TCP). The port "HTTPS" has an associated port number of "443" and uses the TCP protocol. The knowledge base data shown in FIGS. 3A and 3B is abbreviated for purposes of explanation. A particular knowledge base may identify and define any number of roles, services, ports, protocols and other information. A knowledge base entry may also indicate the direction of a required network communication (such as inbound or outbound). For example, a Web Server role requires port 80 to be opened for inbound communication, but a Web Client role would require port 80 to be opened for outbound communication.

Figure 4:
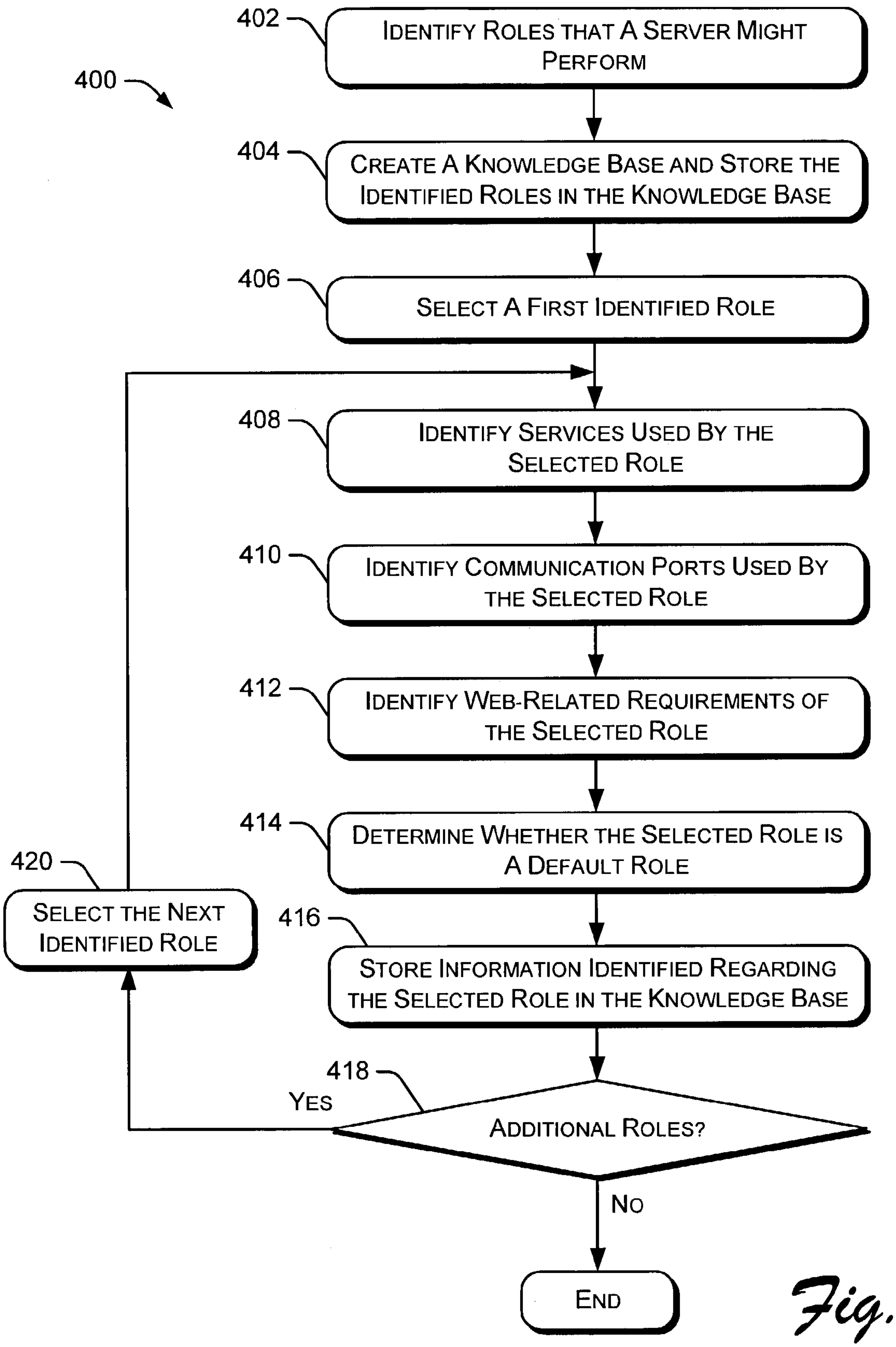
FIG. 4 is a flow diagram illustrating an embodiment of a procedure for generating a knowledge base.

FIG. 4 is a flow diagram illustrating an embodiment of a procedure 400 for generating a knowledge base. Initially, the procedure identifies roles that a server might perform (block 402). These roles may be identified from knowledge of existing servers, published documents or books, user manuals, knowledge of network administrators, etc. The identified roles may represent all possible roles, regardless of whether a particular target server is capable of performing the roles. Alternatively, the identified roles may represent a particular category of roles, such as Internet-related roles. The procedure then creates a knowledge base and stores the identified roles in the knowledge base (block 404).

Procedure 400 begins defining each of the roles in the knowledge base by selecting a first role (block 406). The procedure then identifies one or more services used by the selected role (block 408). Services that may be related to the role, but not required by the role, are referred to herein as "tasks" or "related roles". These tasks or related roles may include, for example, encryption services, decryption services, printing services, data backup services, performance monitoring, handling the storing and forwarding of data, and the like. Procedure 400 then identifies one or more communication ports used by the selected role (block 410). The identified communication ports may include, for example, network communication ports, TCP ports, UDP ports, and the like. For each of the identified communication ports additional information is provided indicating whether the port is needed for inbound communication and/or outbound communication.

Procedure 400 continues by identifying web-related requirements of the selected role (block 412). For example, web-related requirements may include IIS (Internet Information Server) requirements of the selected role. IIS is a web server capable of hosting and managing web pages, hosting and managing ftp sites, and routing news or mail using various protocols. IIS is available from Microsoft Corporation of Redmond, Washington. Examples of IIS requirements include the necessary web extensions (e.g., ASP or ASP.Net), the required virtual directories, and certain minimum values for configuration parameters, such as minimum input buffer size.

The procedure then determines whether the selected role is a default role (block 414). It the selected role is a default role, that information is noted in the knowledge base. The knowledge base also defines directives and procedures for determining whether a role is displayed by default and if so, whether or not it should be selected by default. These directives may be simple directives such as "Yes" or "No" or they may be complex functions that look at various system parameters. Individual users, such as administrators, can define their own functions for determining whether a particular role should be selected by default.

The knowledge base also defines one or more dependencies between roles. For example, if Role A depends on Role B and Role A is selected, then Role B is automatically selected. Similarly, if Role A depends on Role B and both are selected, and Role B is later deselected, then Role A is also deselected. The knowledge base may also include one or more "exclusionary" roles. For example, if Role C is mutually exclusive with Role D and a user selects Role C, then the user cannot also select Role D.

A particular knowledge base may also contain information regarding operating system-specific settings, such as registry values. At block 416, information identified regarding the selected role is stored in the knowledge base. For example, the services and communication ports used by the selected role as well as the IIS requirements of the selected role are stored in the knowledge base.

The procedure then determines whether there are additional roles that were identified (in block 402) that need to be defined (block 418). If not, the procedure ends and the knowledge base defines all identified roles. If additional roles remain to be defined, the procedure branches to block 420, which selects the next identified role. The procedure then returns to block 408 to identify information associated with the selected role.

Figure 5:
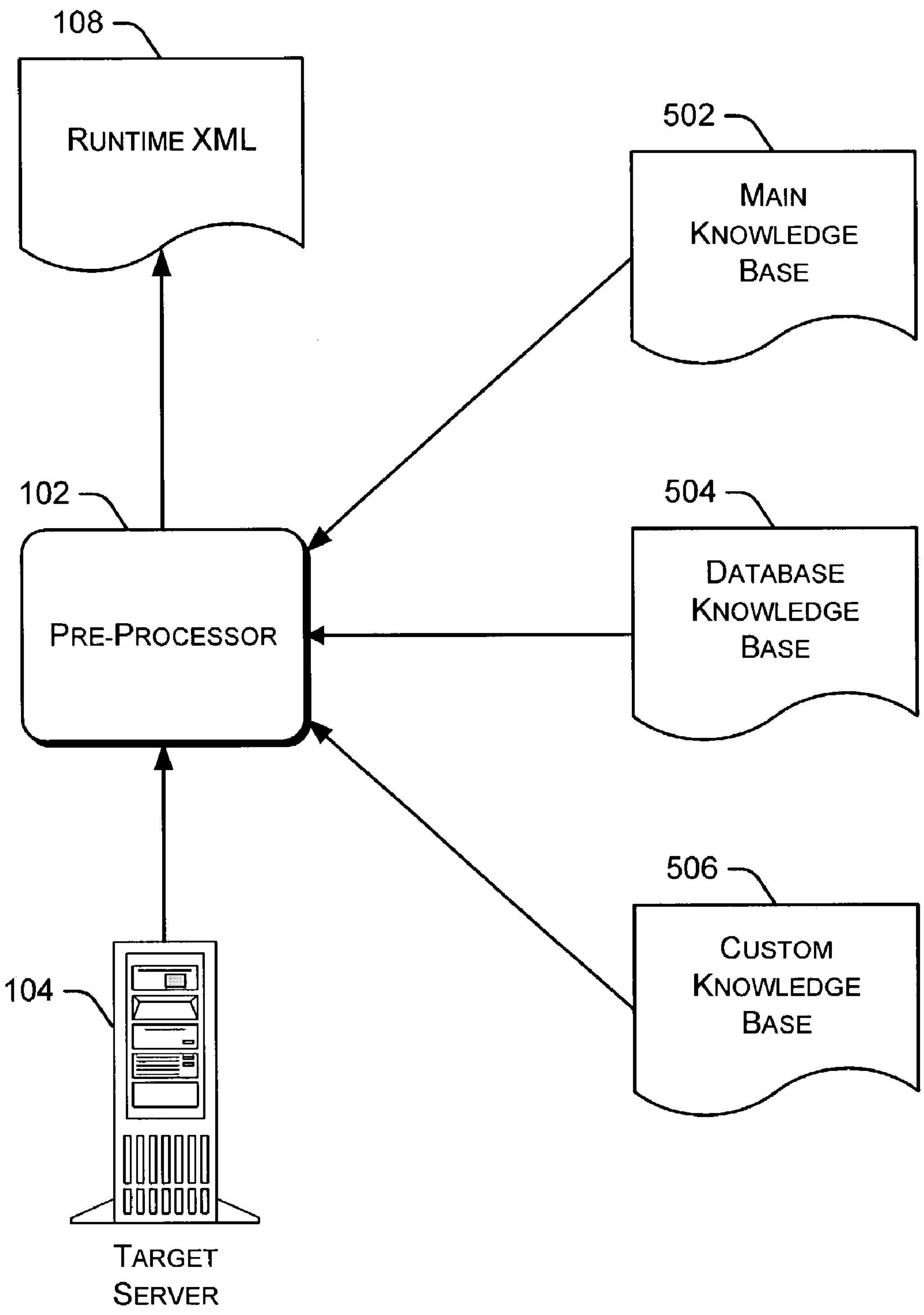
FIG. 5 is a block diagram illustrating an example preprocessor that receives information from multiple knowledge bases.

FIG. 5 is a block diagram illustrating an example pre-processor that receives information from multiple knowledge bases. Pre-processor 102, target server 104 and Runtime XML 108 are similar to those discussed above with respect to FIG. 1. In this example, pre-processor 102 is coupled to receive information from three different knowledge bases 502, 504 and 506. Main knowledge base 502 (also referred to as a "primary" knowledge base) contains definitions of many possible server roles. The definitions in main knowledge base 502 are used by pre-processor 102 to generate the information contained in Runtime XML 108, unless a definition in one of the other knowledge bases 504 or 506 overrides the definition in main knowledge base 502.

Database knowledge base 504 contains definitions related to database roles that a server might perform. Database knowledge base 504 may be provided by a third party, such as a database manufacturing or development company. Thus, the third party can redefine roles or create new roles without affecting main knowledge base 502. Future modifications or updates to knowledge base 502 will not affect the information contained in database knowledge base 504. Certain roles in database knowledge base 504 may differ from the roles contained in main knowledge base 502. However, some roles in database knowledge base 504 may be similar to (and conflict with) roles in main knowledge base. 502. Resolution of such conflicts is discussed below with respect to FIG. 6.

Custom knowledge base 506 contains definitions customized by, for example, a network administrator. Some of these roles may be different from the roles in knowledge bases 502 and 504. However, some of the roles may be similar to the roles in knowledge base 502 or 504. The custom knowledge base 506 allows a network administrator to redefine (or override existing definitions of) one or more roles without tampering with main knowledge base 502 or database knowledge base 504. Future modifications or updates to knowledge bases 502 or 504 will not affect the information contained in custom knowledge base 506.

FIG. 5 illustrates an example embodiment utilizing three different knowledge bases. In alternate embodiments, any number of knowledge bases defining any number of different roles may be coupled to pre-processor 102.

As discussed herein, there are different ways to extend a primary knowledge base. Two ways of extending a primary knowledge base is with an "extension" knowledge base or a "custom" knowledge base. Extension knowledge bases are used to extend the primary knowledge base with new role definitions. A role defined in an extension knowledge base cannot already exist in the primary knowledge base. A role defined in a custom knowledge base must exist in the primary knowledge base. In this case, the definitions in the custom knowledge base (i.e., the services, ports, etc.) override the definition of the role that is defined in the primary knowledge base.

Figure 6:
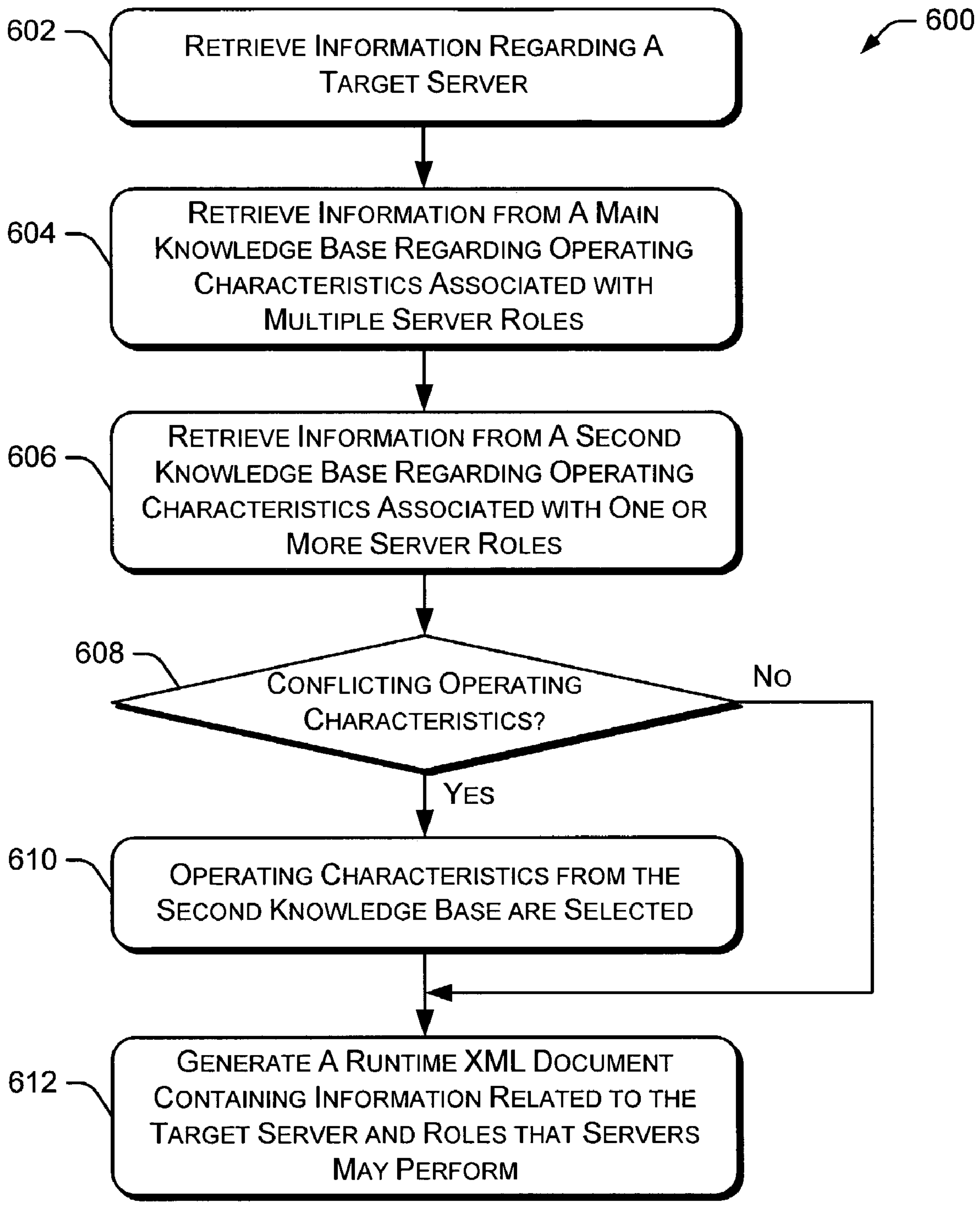
FIG. 6 is a flow diagram illustrating an embodiment of a procedure for retrieving information from multiple knowledge bases.

FIG. 6 is a flow diagram illustrating an embodiment of a procedure 600 for retrieving information from multiple knowledge bases. Initially, the procedure retrieves information regarding a target server (block 602). The procedure then retrieves information from a main knowledge base (e.g., main knowledge base 502 in FIG. 5) regarding operating characteristics associated with multiple server roles (block 604). Next, the procedure retrieves information from a second knowledge base (e.g., database knowledge base 504 or custom knowledge base 506 in FIG. 5) regarding operating characteristics associated with one or more server roles (block 1606). The second knowledge base may also be referred to as a secondary knowledge base.

Procedure 600 then determines whether there are conflicting operating characteristics (e.g., similar roles) between the main knowledge base and the second knowledge base (block 608). If there are conflicting operating characteristics, the procedure selects the operating characteristics from the second knowledge base (block 610), thereby disregarding the conflicting operating characteristics in the main knowledge base. In alternate embodiments, the procedure may select the operating characteristics from the main knowledge base, instead of the second knowledge base. The procedure then generates a Runtime XML document containing information related to the target server and roles that servers may perform. The single Runtime XML document contains information collected from any number of different knowledge bases. To finish configuring the target server, procedures similar to those discussed above with respect to FIG. 2 are performed.

Although FIG. 6 retrieves information from two different knowledge bases, alternate embodiments can retrieve information from any number of different knowledge bases.

Figure 7:
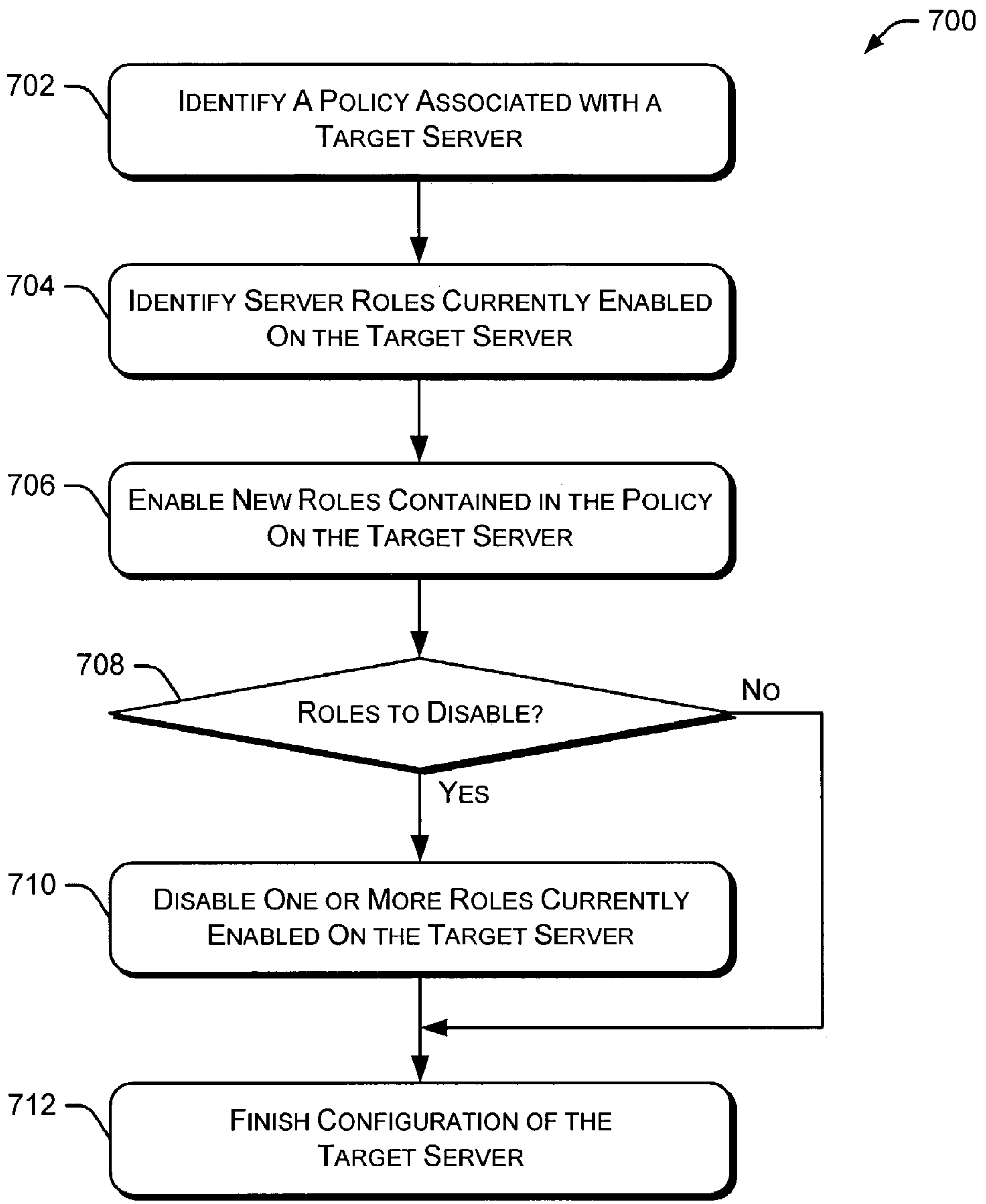
FIG. 7 is a flow diagram illustrating an embodiment of a procedure for configuring a server.

FIG. 7 is a flow diagram illustrating an embodiment of a procedure 700 for configuring a server. Initially, procedure 700 identifies a policy associated with a target server (block 702). The identified policy includes one or more roles that the target server is to perform. Additionally, the identified policy may include one or more roles that the target server is not to perform. Other policies may include one or more roles that the target server is to perform in addition to any roles currently enabled on the target server.

The procedure continues by identifying one or more server roles currently enabled on the target server (block 704). A particular target server may have previously been acting as a server and, therefore, has certain server roles enabled. Procedure 700 enables the new roles contained in the policy on the target server (block 706). The procedure then determines whether any of the currently enabled roles on the target server should be disabled (block 708). This determination is based on information contained in the policy associated with the target server, such as "disable all other server roles" or "disable any file server or web server roles". If one or more roles on the target server need to be disabled, those roles are disabled at block 710. Finally, the procedure finishes configuration of the target server (block 712).

FIG. 8 illustrates an example of a Runtime XML file 800 generated by pre-processor 102. For the Runtime XML file 500, the pre-processor sets the <satisfiable> element and the<selected> element for each role. "Satisfiability" is determined by whether or not the target system (e.g., the target server) has all the required services for the corresponding role. "Selected" is determined by different methods that may depend on how aggressive the user is with the security policy, the type of role and any custom functions that can be invoked. The pre-processor can also provide role-independent information such as the IP addresses associated with the target system and the OS version of the target system.

FIGS. 9A and 9B illustrate an example of an Output XML file 900 associated with one or more servers. "Service Names" are the services that make up a particular role. For example, a Web Server Role needs the HTTPfilter, IISAdmin, and W3SVC services. In the example of FIGS. 6A and 6B, only a few Service Names are shown. A particular Output XML file may include any number of Service Names.

Based on the roles that are selected, the corresponding Service Names are enabled and the remaining services are disabled, thereby improving the security of the system. Since each active service provides a potential area for security failures, reducing the number of active services enhances security. "Extension IDs" inform the configuration engine what extension understands the data contained therein. For example, IPSec data can be passed to the IPSec extension for processing. "Filters" define the interface on which the packet filtering process will be implemented. "Port exemptions" and "Dynamic exemptions" identify the traffic that is allowed through the associated filter.

The following is an example of a transformed version of the Output XML file. This transformed version is generated by transformation module 118 and applied to a target server.

```
    ipsec
    static
    set store location=local
    delete rule all "SCW Policy"
    delete policy name="SCW Policy"
    delete filteraction name="$SCW$_Block"
    delete filteraction name="$SCW$_Permit"
    delete filteraction name="$SCW$_Require-Hi"
    delete filteraction name="$SCW$_Require-Lo"
    delete filteraction name="$SCW$_Request-Hi"
    delete filteraction name="$SCW$_Request-Lo"
    delete filterlist name="$SCW$_DefaultDeny"
    delete filterlist name="$SCW$_InboundPortExemptions"
    delete filterlist name="$SCW$_OutboundPortExemptions"
    delete filterlist name="$SCW$_InboundAttackVector"
    delete filterlist name="$SCW$_MachineExemptions"
    delete filterlist name="$SCW$_TrustedGroup1"
    delete filterlist name="$SCW$_TrustedGroup2"
    delete filterlist name="$SCW$_TrustedGroup3"
    delete filterlist name="$SCW$_TrustedGroup4"
    delete filterlist name="$SCW$_DynamicExemptions"
    delete filterlist name="$SCW$_ProtocolExemptions"
    add policy name="SCW Policy" description="Security Configuration Wizard Policy"
activatedefaultrule=no assign=no
    add filteraction name="$SCW$_Block" description="Discard"
action=block
    add filteraction name="$SCW$_Permit" description="Pass without
modification or security" action=permit
    add filteraction name="$SCW$_Require-Hi" description="Negotiate, No Fallback,
No Inpass" inpass=no soft=No action=negotiate qmsec="AH[SHA1]+
ESP[None,SHA1] AH[MD5]+ESP[None,SHA1] AH[SHA1]+ESP[None,MD5]
AH[MD5]+ESP[None,MD5] ESP[None,SHA1] ESP[None,MD5] AH[SHA1]
AH[MD5] "
    add filteraction name="$SCW$_Require-Lo" description="Negotiate, No Fallback,
Inpass" inpass=yes soft=No action=negotiate qmsec="AH[SHA1]+
ESP[None,SHA1] AH[MD5]+ESP[None,SHA1] AH[SHA1]+ESP[None,MD5]
AH[MD5]+ESP[None,MD5] ESP[None,SHA1] ESP[None,MD5] AH[SHA1]
AH[MD5] "
    add filteraction name="$SCW$_Request-Hi" description="Negotiate,
Fallback, No Inpass" inpass=no soft=Yes action=negotiate qmsec="AH[SHA1]+
ESP[None,SHA1] AH[MD5]+ESP[None,SHA1] AH[SHA1]+ESP[None,MD5]
AH[MD5]+ESP[None,MD5] ESP[None,SHA1] ESP[None,MD5] AH[SHA1]
AH[MD5] "
    add filteraction name="$SCW$_Request-Lo" description="Negotiate,
Fallback, Inpass" inpass=yes soft=Yes action=negotiate qmsec="AH[SHA1]+
ESP[None,SHA1] AH[MD5]+ESP[None,SHA1] AH[SHA1]+ESP[None,MD5]
AH[MD5]+ESP[None,MD5] ESP[None,SHA1] ESP[None,MD5] AH[SHA1]
AH[MD5] "
    add filterlist name="$SCW$_DefaultDeny" description="Traffic to be
blocked"
    add filterlist name="$SCW$_InboundPortExemptions" description="Ports to permit
(Inbound)"
    add filterlist name="$SCW$_OutboundPortExemptions"
```

-continued

```
description="Ports to permit (Outbound)"
    add filterlist name="$SCW$_InboundAttackVector" description="Mitigate
holes opened by outbound communication requirement"
    add filterlist name="$SCW$_MachineExemptions" description="Machines
or Subnets to Permit"
    add filterlist name="$SCW$_TrustedGroup1" description="Machines or Subnets
to Require Security with Hi"
    add filterlist name="$SCW$_TrustedGroup2" description="Machines or Subnets
to Require Security with Lo"
    add filterlist name="$SCW$_TrustedGroup3" description="Machines or Subnets
to Request Security with Hi"
    add filterlist name="$SCW$_TrustedGroup4" description="Machines or Subnets
to Request Security with Lo"
    add filterlist name="$SCW$_DynamicExemptions"
description="Infrastructure Traffic"
    add filterlist name="$SCW$_ProtocolExemptions" description="IP
Protocols to Permit"
    add filter filterlist="$SCW$_DefaultDeny" dstaddr=157.59.132.0
srcaddr=any description="any to me/IP" protocol=ANY mirrored=yes
srcmask=255.255.255.255 dstmask=255.255.252.0
    add filter filterlist="$SCW$_InboundPortExemptions"
dstaddr=157.59.132.0 srcaddr=any description="any to me/IP" protocol=TCP
mirrored=yes srcmask=255.255.255.255 dstmask=255.255.252.0 dstport=80
srcport=0
    add filter filterlist="$SCW$_InboundPortExemptions"
dstaddr=157.59.132.0 srcaddr=any description="any to me/IP" protocol=TCP
mirrored=yes srcmask=255.255.255.255 dstmask=255.255.252.0 dstport=443
srcport=0
    add filter filterlist="$SCW$_ProtocolExemptions" dstaddr=me srcaddr=any
description="Protocol filter" protocol=ICMP mirrored=yes
srcmask=255.255.255.255 dstmask=255.255.255.255
    add rule name="$SCW$_Block_DefaultDeny" policy="SCW Policy"
filterlist="$SCW$_DefaultDeny" filteraction="$SCW$_Block" activate=yes
    add rule name="$SCW$_Permit_InboundPortExemptions" policy="SCW Policy"
filterlist="$SCW$_InboundPortExemptions" filteraction=
"$SCW$_Permit" activate=yes
    add rule name="$SCW$_Permit_OutboundPortExemptions" policy="SCW Policy"
filterlist="$SCW$_OutboundPortExemptions"
filteraction="$SCW$_Permit" activate=yes
    add rule name="$SCW$_MitigateInboundAttackVector" policy="SCW
Policy" filterlist="$SCW$_InboundAttackVector" filteraction="$SCW$_Block"
activate=yes
    add rule name="$SCW$_Permit_MachineExemptions" policy="SCW
Policy" filterlist="$SCW$_MachineExemptions" filteraction="$SCW$_Permit"
activate=yes
    add rule name="$SCW$_Require-Hi_TrustedGroup1" policy="SCW Policy"
filterlist="$SCW$_TrustedGroup1" filteraction="$SCW$_Require-Hi"
activate=yes kerberos=Yes
    add rule name="$SCW$_Require-Lo_TrustedGroup2" policy="SCW
Policy" filterlist="$SCW$_TrustedGroup2" filteraction="$SCW$_Require-Lo"
activate=yes kerberos=Yes
    add rule name="$SCW$_Request-Hi_TrustedGroup3" policy="SCW
Policy" filterlist="$SCW$_TrustedGroup3" filteraction="$SCW$_Request-Hi"
activate=yes kerberos=Yes
    add rule name="$SCW$_Request-Lo_TrustedGroup4" policy="SCW
Policy" filterlist="$SCW$_TrustedGroup4" filteraction="$SCW$_Request-Lo"
activate=yes kerberos=Yes
    add rule name="$SCW$_Permit_DynamicExemptions" policy="SCW
Policy" filterlist="$SCW$_DynamicExemptions" filteraction="$SCW$_Permit" activate=yes
    add rule name="$SCW$_Permit_ProtocolExemptions" policy="SCW
Policy" filterlist="$SCW$_ProtocolExemptions" filteraction="$SCW$_Permit" activate=yes
    set policy name="SCW Policy" assign=y
```

The above transformed version of the Output XML file contains various settings and other information used to configure the target server. An IPSec filter describes a subset of network traffic in terms of five parameters: SA (Source Address), DA (Destination Address), SP (Source Port), DP (Destination Port), and Protocol. A Filter List includes one or more such filters that may describe a larger subset of traffic that can trigger a specific filter action, such as Block or Permit. Rules associate filter lists with filter actions.

Figure 10:
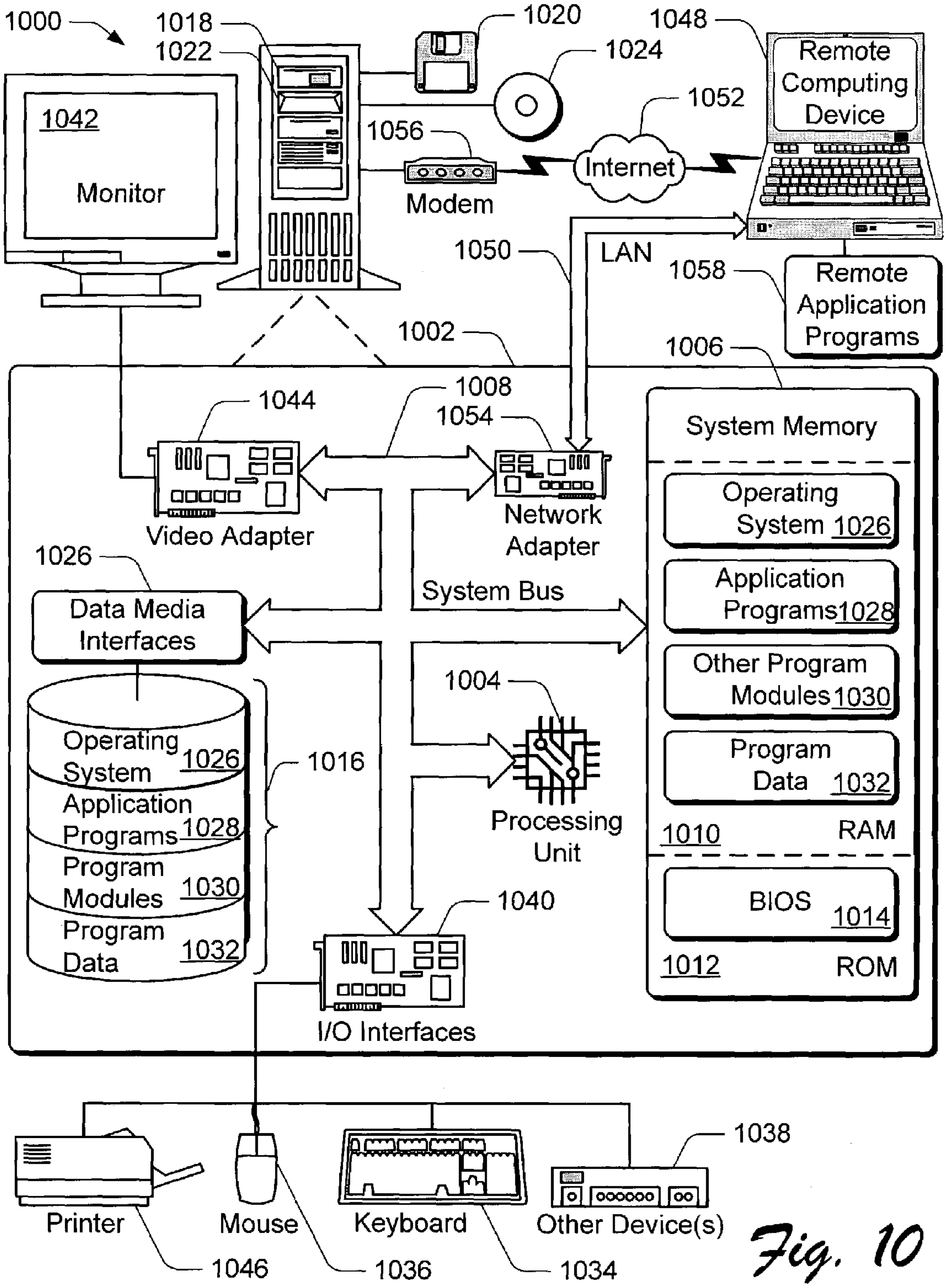
FIG. 10 illustrates an example of a computing environment.

FIG. 10 illustrates an example of a computing environment 1000 within which the server configuration systems and methods, can be either fully or partially implemented. Computing environment 1000 is only one example of a computing system and is not intended to suggest any limitation as to the scope of use or functionality of the network architectures. Neither should the computing environment 1000 be interpreted as having any dependency or requirement relating to any one or combination of components illustrated in the example computing environment 1000.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

The computing environment 1000 includes a general-purpose computing system in the form of a computing device 1002. The components of computing device 1002 can include, but are not limited to, one or more processors 1004 (e.g., any of microprocessors, controllers, and the like), a system memory 1006, and a system bus 1008 that couples various system components including the processor 1004 to the system memory 1006. The one or more processors 1004 process various computer-executable instructions to control the operation of computing device 1002 and to communicate with other electronic and computing devices.

The system bus 1008 represents any number of several types of bus or switching structures, including a memory bus or memory controller, point-to-point connections, a switching fabric, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computing environment 1000 typically includes a variety of computer-readable media. Such media can be any available media that is accessible by computing device 1002 and includes both volatile and non-volatile media, removable and non-removable media. The system memory 1006 includes computer-readable media in the form of volatile memory, such as random access memory (RAM) 1010, and/or non-volatile memory, such as read only memory (ROM) 1012. A basic input/output system (BIOS) 1014, containing the basic routines that help to transfer information between elements within computing device 1002, such as during start-up, is stored in ROM 1012. RAM 1010 typically contains data and/or program modules that are immediately accessible to and/or presently operated on by the processing unit 1004.

Computing device 1002 can also include other removable/non-removable, volatile/non-volatile computer storage media. By way of example, a hard disk drive 1016 is included for reading from and writing to a non-removable, non-volatile magnetic media (not shown), a magnetic disk drive 1018 for reading from and writing to a removable, non-volatile magnetic disk 1020 (e.g., a "floppy disk"), and an optical disk drive 1022 for reading from and/or writing to a removable, non-volatile optical disk 1024 such as a CD-ROM, DVD, or any other type of optical media. The hard disk drive 1016, magnetic disk drive 1018, and is optical disk drive 1022 are each connected to the system bus 1008 by one or more data media interfaces 1026. Alternatively, the hard disk drive 1016, magnetic disk drive 1018, and optical disk drive 1022 can be connected to the system bus 1008 by a SCSI interface (not shown).

The disk drives and their associated computer-readable media provide non-volatile storage of computer-readable instructions, data structures, program modules, and other data for computing device 1002. Although the example illustrates a hard disk 1016, a removable magnetic disk 1020, and a removable optical disk 1024, it is to be appreciated that other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on the hard disk 1016, magnetic disk 1020, optical disk 1024, ROM 1012, and/or RAM 1010, including by way of example, an operating system 1026, one or more application programs 1028, other program modules 1030, and program data 1032. Each of such operating system 1026, one or more application programs 1028, other program modules 1030, and program data 1032 (or some combination thereof) may include an embodiment of the systems and methods for a test instantiation system.

Computing device 1002 can include a variety of computer-readable media identified as communication media. Communication media typically embodies computer-readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

A user can enter commands and information into computing device 1002 via input devices such as a keyboard 1034 and a pointing device 1036 (e.g., a "mouse"). Other input devices 1038 (not shown specifically) may include a microphone, joystick, game pad, controller, satellite dish, serial port, scanner, and/or the like. These and other input devices are connected to the processing unit 1004 via input/output interfaces 1040 that are coupled to the system bus 1008, but may be connected by other interface and bus structures, such as a parallel port, game port, and/or a universal serial bus (USB).

A monitor 1042 or other type of display device can also be connected to the system bus 1008 via an interface, such as a video adapter 1044. In addition to the monitor 1042, other output peripheral devices can include components such as speakers (not shown) and a printer 1046 which can be connected to computing device 1002 via the input/output interfaces 1040.

Computing device 1002 can operate in a networked environment using logical connections to one or more remote computers, such as a remote computing device 1048. By way of example, the remote computing device 1048 can be a personal computer, portable computer, a server, a router, a network computer, a peer device or other common network node, and the like. The remote computing device 1048 is illustrated as a portable computer that can include many or all of the elements and features described herein relative to computing device 1002.

Logical connections between computing device 1002 and the remote computer 1048 are depicted as a local area network (LAN) 1050 and a general wide area network (WAN) 1052. Such networking environments are commonplace in offices, enterprise-wide computer networks, intranets, and the Internet. When implemented in a LAN networking environment, the computing device 1002 is connected to a local network 1050 via a network interface or adapter 1054. When implemented in a WAN networking environment, the computing device 1002 typically includes a modem 1056 or other means for establishing communications over the wide network 1052. The modem 1056, which can be internal or external to computing device 1002, can be connected to the system bus 1008 via the input/output interfaces 1040 or other appropriate mechanisms. It is to be appreciated that the illustrated network connections are exemplary and that other means of establishing communication link(s) between the computing devices 1002 and 1048 can be employed.

In a networked environment, such as that illustrated with computing environment 1000, program modules depicted relative to the computing device 1002, or portions thereof, may be stored in a remote memory storage device. By way of example, remote application programs 1058 reside on a memory device of remote computing device 1048. For purposes of illustration, application programs and other executable program components, such as the operating system, are illustrated herein as discrete blocks, although it is recognized that such programs and components reside at various times in different storage components of the computer system 1002, and are executed by the data processor(s) of the computer.

Particular examples discussed herein relate to creating a security policy and configuring a server with that security policy. Similar procedures can be used to modify existing security policies, apply an existing security policy to another server, or analyze a server for compliance with a particular security policy.

Although the description above uses language that is specific to structural features and/or methodological acts, it is to be understood that the invention defined in the appended claims not limited to the specific features or acts described. Rather, the specific features and acts are disclosed as exemplary forms of implementing the invention.

The invention claimed is:

1. A method comprising:

generating a raw knowledge base, the generating of the raw knowledge base comprising:

identifying a plurality of server roles;

storing the plurality of server roles in the raw knowledge base;

for each of the plurality of server roles:

identifying at least one service used by the server role, including identifying a security service used by the server role;

identifying at least one communication port used by the server role;

identifying any web-related requirements of the server role;

responsive to one or more dependencies between server roles, identifying the dependencies between the server roles;

storing the identified information regarding each of the server roles in the raw knowledge base;

providing the identified information stored in the raw knowledge base for comparison with a current state of a server;

based on the comparison, creating a run-time specific knowledge base representative of configurations that the server is capable of performing; and presenting a user interface comprising configuration options to an administrator, wherein the user interface restricts selection of the configuration options to the configurations that the server is capable of performing.

2. A method as recited in claim 1 further comprising determining whether each of the plurality of server roles is a default server role.

3. A method as recited in claim 1 further comprising:

determining whether each of the plurality of server roles is a default server role; and storing the results of the determination in the knowledge base.

4. A method as recited in claim 3 wherein one of the plurality of server roles is a file server.

5. A method as recited in claim 1 wherein identifying any web-related requirements of the server role includes identifying Internet Information Server requirements of the server role.

6. A method as recited in claim 1 wherein identifying at least one communication port used by the server role includes identifying a network communication port used by the server role.

7. A method as recited in claim 6 wherein one of the plurality of server roles is a domain controller.

8. A method as recited in claim 1 wherein identifying at least one communication port used by the server role includes identifying whether the communication port is needed for inbound or outbound communications.

9. A method as recited in claim 1 wherein one of the plurality of server roles is a web server.

10. A method as recited in claim 1 further comprising configuring a target server using information contained in the knowledge base.

11. A method as recited in claim 1, wherein the identifying of the dependencies further comprises, for each of the plurality of server roles:

determining whether the role is currently being performed by a target server.

12. One or more computer-readable memories containing a computer program that is executable by a processor to perform the method recited in claim 1.

13. A method comprising:

retrieving role information from a first knowledge base;

retrieving role information from a second knowledge base;

resolving any conflicting role information between the first knowledge base and the second knowledge base; and generating a document containing role information from the first knowledge base and the second knowledge base, wherein the document is used in configuring a target server.

14. A method as recited in claim 13 wherein the document containing role information is an XML document.

15. A method as recited in claim 13 wherein the first knowledge base is a primary knowledge base and the second knowledge base is a custom knowledge base.

16. A method as recited in claim 13 wherein the first knowledge base is a primary knowledge base and the second knowledge base is an extension knowledge base.

17. A method as recited in claim 13 further comprising updating the second knowledge base without modifying the first knowledge base.

18. A method as recited in claim 13 wherein resolving any conflicting role information includes ignoring conflicting role information from the first knowledge base.

19. A method as recited in claim 13 further comprising retrieving information regarding a target server, wherein the document containing role information includes information regarding the target server.

20. A method as recited in claim 13 wherein the role information retrieved from the first knowledge base and the second knowledge base includes:

at least one service used by a particular role;

at least one communication port used by the particular role; and any web-related requirements of the particular role.

21. One or more computer-readable memories containing a computer program that is executable by a processor to perform the method recited in claim 13.

22. An apparatus comprising:

a first knowledge base containing information associated with a first plurality of server roles, the first knowledge base to identify services and communication ports used by the first plurality of server roles;

a second knowledge base containing information associated with a second plurality of server roles, the second knowledge base to identify services and communication ports used by the second plurality of server roles; and a pre-processor coupled to the first knowledge base and the second knowledge base, to identify characteristics of a target server coupled to the pre-processor, and to create a document containing information from the first knowledge base and the second knowledge base that is relevant to configuration of the target server.

23. An apparatus as recited in claim 22 wherein conflicts between roles in the first knowledge base and the second knowledge base are resolved by using the role defined in the second knowledge base.

24. An apparatus as recited in claim 22 further comprising a third knowledge base coupled to the pre-processor, wherein the third knowledge base contains information associated with a third plurality of server roles and identifies services and communication ports used by the third plurality of server roles.

25. An apparatus as recited in claim 24 wherein conflicts between roles in the third knowledge base and any other knowledge base are resolved by using the role defined in the third knowledge base.

26. An apparatus as recited in claim 22 wherein the first knowledge base and the second knowledge base are XML documents.

27. One or more computer-readable media having stored thereon a computer program that, when executed by one or more processors, causes the one or more processors to:

create a knowledge base to store information regarding server roles;

identify a plurality of server roles;

store the plurality of server roles in the knowledge base;

identify services associated with each of the plurality of server roles, including identifying a security service associated with each of the plurality of server roles;

identify communication ports associated with each of the plurality of server roles;

identify web-related requirements associated with each of the plurality of server roles;

responsive to any role dependencies, identify the role dependencies;

store information regarding the identified services, communication ports and web-related requirements in the knowledge base;

provide the stored information for comparison with a current state of a server;

based on the comparison, identify configurations that the server is capable of performing; and present a user interface to an administrator, wherein the user interface restricts selection of configuration options to the identified configurations.

28. One or more computer-readable media as recited in claim 27 wherein the one or more processors further determine whether each of the plurality of server roles is a default server role.

29. One or more computer-readable media as recited in claim 28 wherein the one or more processors further store information regarding default server roles in the knowledge base.

30. One or more computer-readable media as recited in claim 27 wherein the one or more processors further configure a target server using information contained in the knowledge base.

31. One or more computer-readable media as recited in claim 28 wherein the identifying of the role dependencies further comprises:

determining whether each of the plurality of server roles is currently being performed by a target server.

32. A method of generating a knowledge base, the method comprising:

identifying a plurality of server roles;

storing the plurality of server roles in the knowledge base;

for each of the plurality of server roles:

identifying at least one security service used by the server role;

identifying at least one communication port used by the server role;

identifying any web-related requirements of the server role;

responsive to one or more role dependencies, identifying the role dependencies;

storing the identified information regarding each of the server roles in the knowledge base, wherein the stored identified information is provided for use in configuring a target server.

* * * * *